(12) United States Patent
Lim

(10) Patent No.: US 10,403,177 B2
(45) Date of Patent: Sep. 3, 2019

(54) FLEXIBLE DISPLAY DEVICE OF WHICH END PORTION IS PERTURBABLE BY USING ELASTIC FORCE OF FLEXIBLE DISPLAY DEVICE DURING HINGE OPERATION

(71) Applicant: You Seob Lim, Goyang-si (KR)

(72) Inventor: You Seob Lim, Goyang-si (KR)

(*) Notice: Subject to any disclaimer, the term of this patent is extended or adjusted under 35 U.S.C. 154(b) by 0 days.

(21) Appl. No.: 15/899,294

(22) Filed: Feb. 19, 2018

(65) Prior Publication Data

US 2018/0174497 A1    Jun. 21, 2018

Related U.S. Application Data

(60) Division of application No. 15/430,447, filed on Feb. 11, 2017, now Pat. No. 9,934,706, which is a
(Continued)

(30) Foreign Application Priority Data

Aug. 15, 2014 (KR) .................. 10-2014-0106358

(51) Int. Cl.
*G09F 9/30* (2006.01)
*G09F 9/00* (2006.01)
(Continued)

(52) U.S. Cl.
CPC ............ G09F 9/301 (2013.01); G06F 1/1616 (2013.01); G06F 1/1624 (2013.01);
(Continued)

(58) Field of Classification Search
CPC .......... G09F 9/301; G09F 9/00; G06F 1/1681; G06F 1/1652; G06F 1/1632;
(Continued)

(56) References Cited

U.S. PATENT DOCUMENTS

| 6,016,176 A  * | 1/2000 | Kim ................. G02F 1/133305 349/158 |
| 8,300,416 B2 * | 10/2012 | Yang ....................... G06F 1/162 361/679.01 |

(Continued)

FOREIGN PATENT DOCUMENTS

| KR | 10-2008-0012667 A | 2/2008 |
| KR | 10-2012-0002084 A | 1/2012 |

(Continued)

*Primary Examiner* — Dimary S Lopez Cruz
*Assistant Examiner* — Abhishek M Rathod
(74) *Attorney, Agent, or Firm* — Patent Office of Dr. Chung Park

(57) ABSTRACT

Disclosed herein is a flexible display apparatus including: a fixing body of which a hinge is applied to one or two edges; flexible display means whose one end portion is fixed to the fixing body and whose the other end portion which is not fixed is capable of being folded and unfolded in a state where the unfixed portion is supported at the outer circumferential surface of the hinge; and a cover plate which is assembled to a hinge shape of the fixing body in a rotatable state and has a sliding space part and a sliding guide jaw for allowing sliding of the unfixed portion of the flexible display means and supporting the unfixed portion of the flexible display means. A sliding plate which surrounds the unfixed end portion of the flexible display means and slides on the cover plate is additionally provided.

6 Claims, 17 Drawing Sheets

Related U.S. Application Data continuation-in-part of application No. PCT/KR2015/008558, filed on Aug. 17, 2015.

(51) Int. Cl.
    *G06F 1/16*     (2006.01)
    *H05K 5/00*     (2006.01)
    *H04M 1/02*     (2006.01)

(52) U.S. Cl.
    CPC .......... *G06F 1/1652* (2013.01); *G06F 1/1681* (2013.01); *G09F 9/00* (2013.01); *H04M 1/0216* (2013.01); *H04M 1/0237* (2013.01); *H04M 1/0247* (2013.01); *H04M 1/0268* (2013.01); *H05K 5/0017* (2013.01)

(58) Field of Classification Search
    CPC ........ G06F 1/1626; G06F 1/1601; G06F 1/16; G06F 1/1679; G06F 1/1683; G06F 2200/1631; H05K 5/0017; H05K 5/03; H05K 5/0226; H04N 5/655; F16M 11/00; H04M 1/0216
    USPC .............. 361/679.21–679.3, 679.55, 679.56; 455/575.1–575.9
    See application file for complete search history.

(56) References Cited

U.S. PATENT DOCUMENTS

| | | | |
|---|---|---|---|
| 8,787,016 B2 | 7/2014 | Rothkopf et al. | |
| 2011/0148797 A1* | 6/2011 | Huitema | G06F 1/1615 345/173 |
| 2012/0002360 A1* | 1/2012 | Seo | G06F 1/1616 361/679.01 |
| 2012/0019482 A1* | 1/2012 | Wang | G06F 1/1652 345/175 |
| 2012/0200991 A1* | 8/2012 | Ryu | G06F 1/1601 361/679.01 |
| 2013/0010405 A1* | 1/2013 | Rothkopf | H04M 1/0216 361/679.01 |
| 2013/0058063 A1* | 3/2013 | O'Brien | G06F 1/1624 361/807 |
| 2013/0271898 A1* | 10/2013 | Chen | H05K 5/02 361/679.01 |
| 2013/0328792 A1 | 12/2013 | Myers | |

FOREIGN PATENT DOCUMENTS

| | | |
|---|---|---|
| KR | 10-2010-0062787 A | 8/2013 |
| KR | 10-2012-0068710 A | 4/2014 |
| KR | 10-2014-0045024 A | 4/2014 |
| KR | 10-2014-0050504 A | 4/2014 |

* cited by examiner

[FIG. 1] (PRIOR ART)
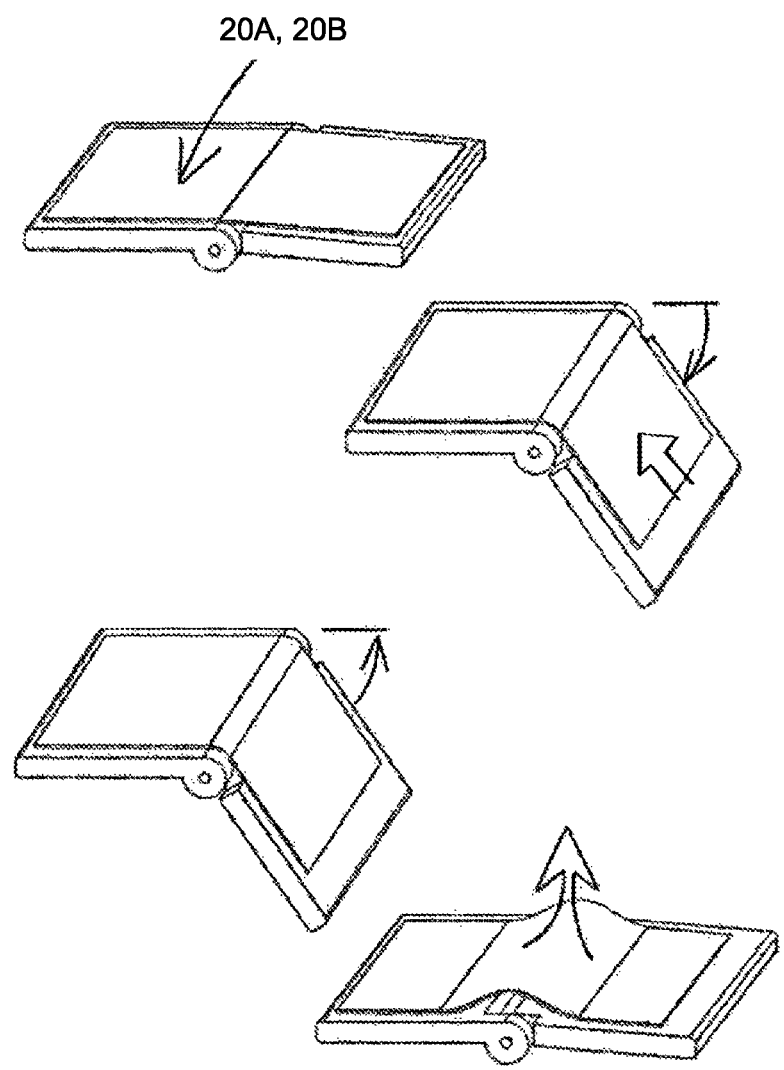

[FIG. 2]
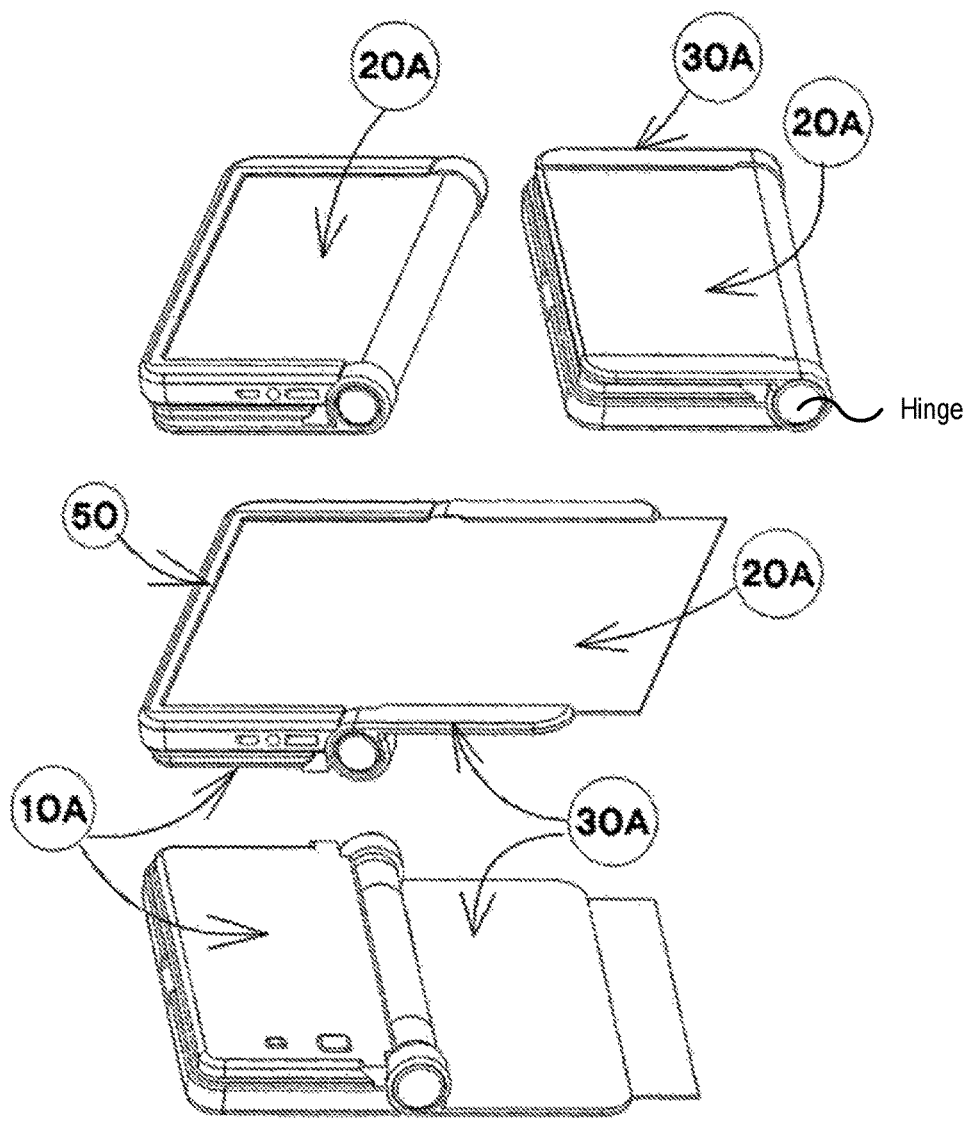

[FIG. 3]
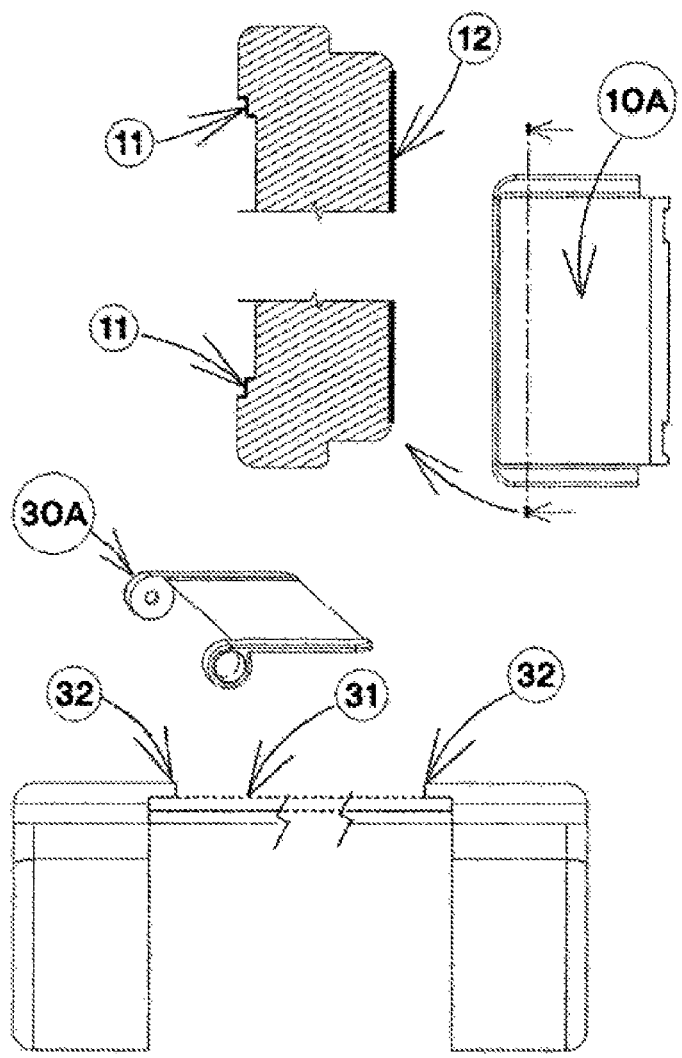

[FIG. 4]
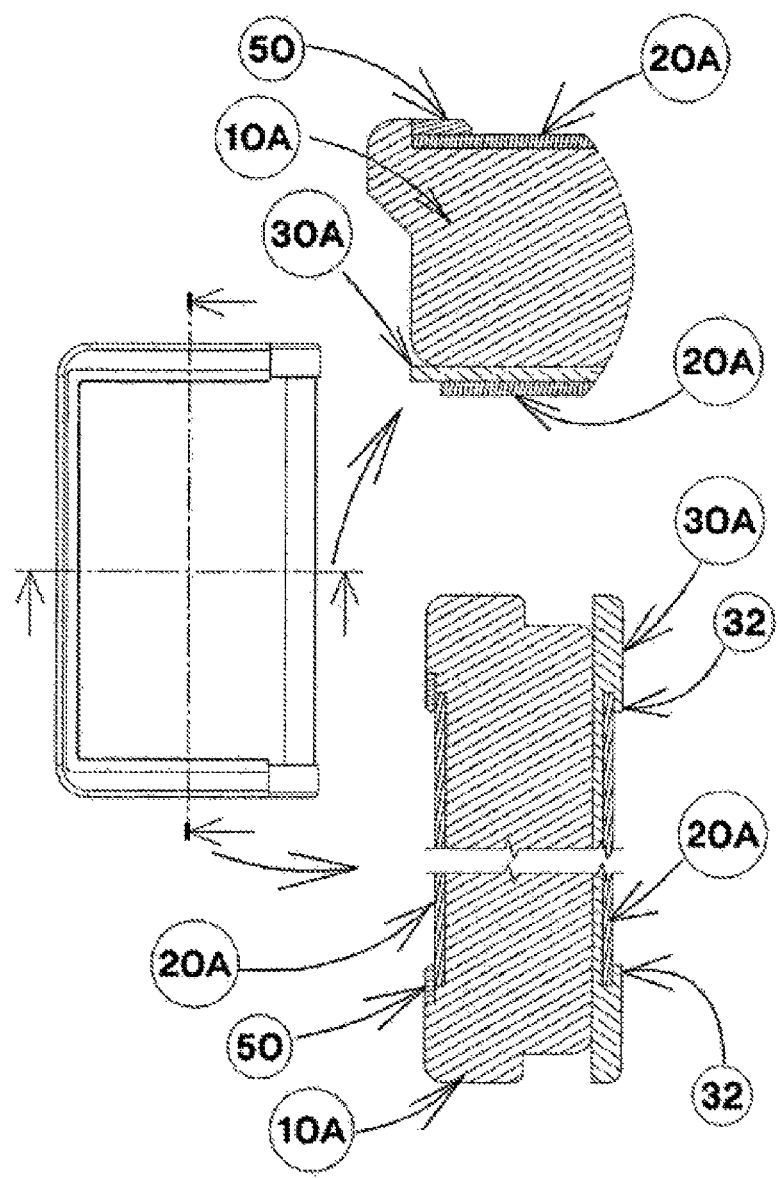

[FIG. 5]
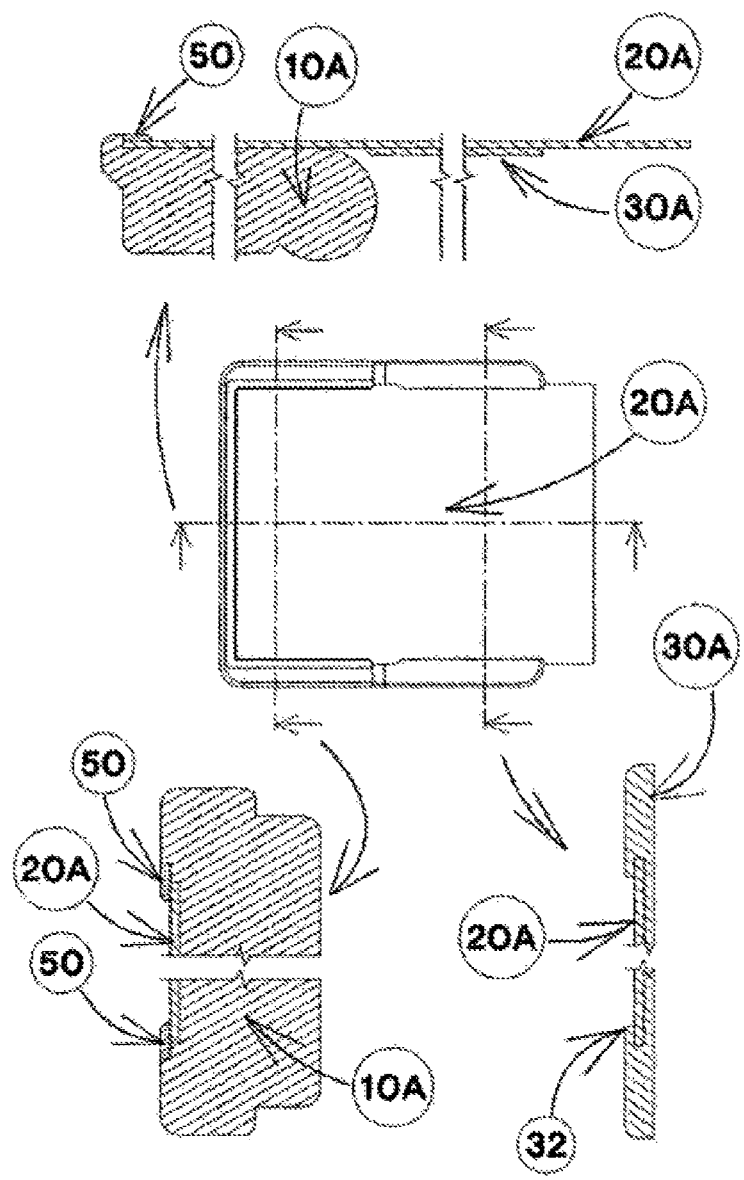

[FIG. 6]
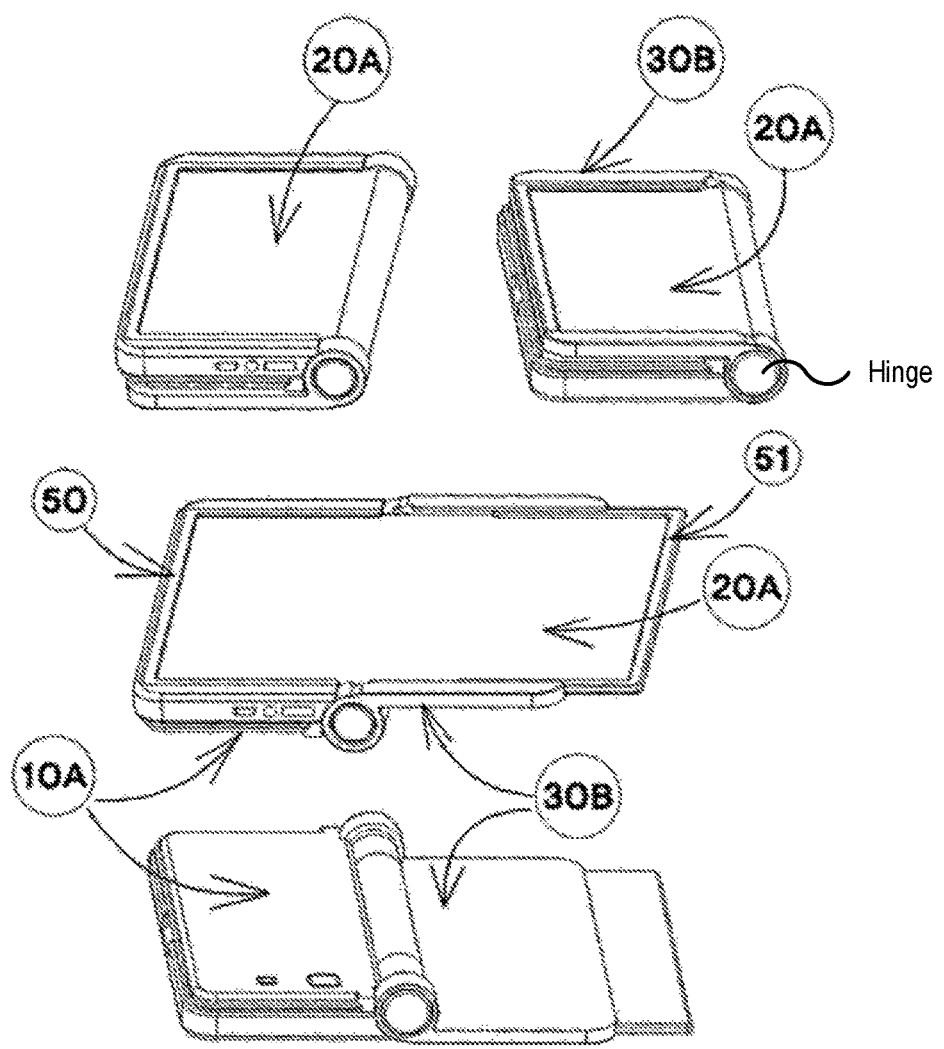

[FIG. 7]
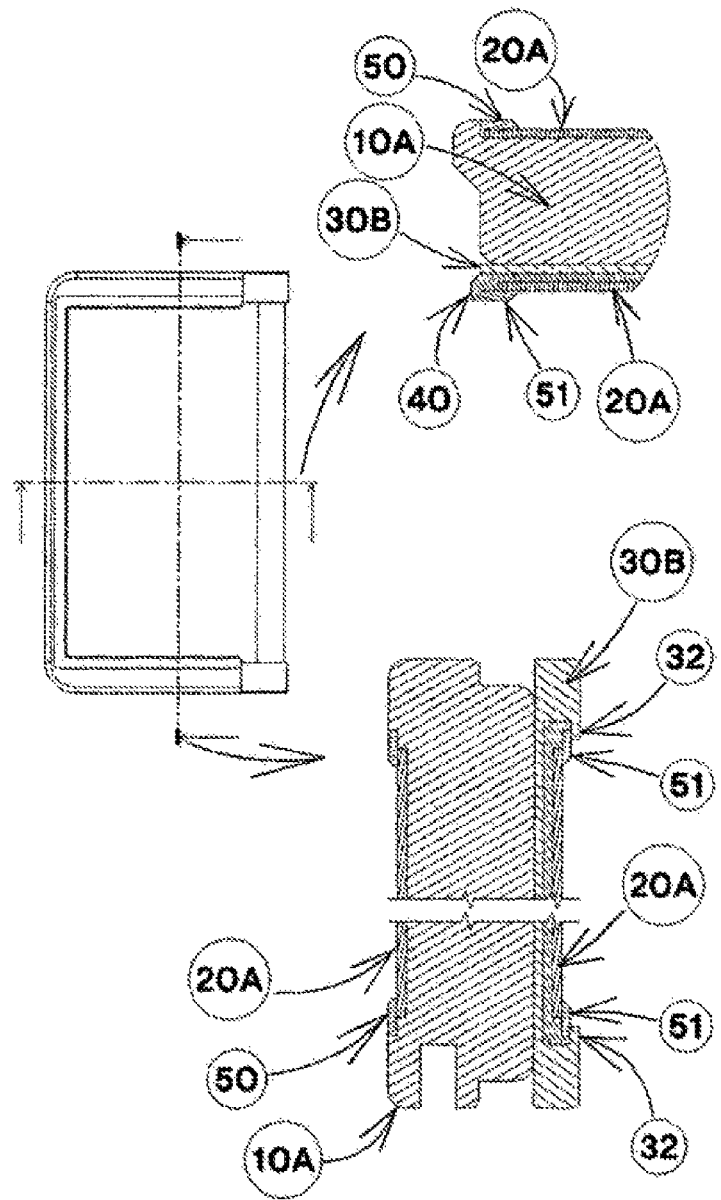

[FIG. 8]
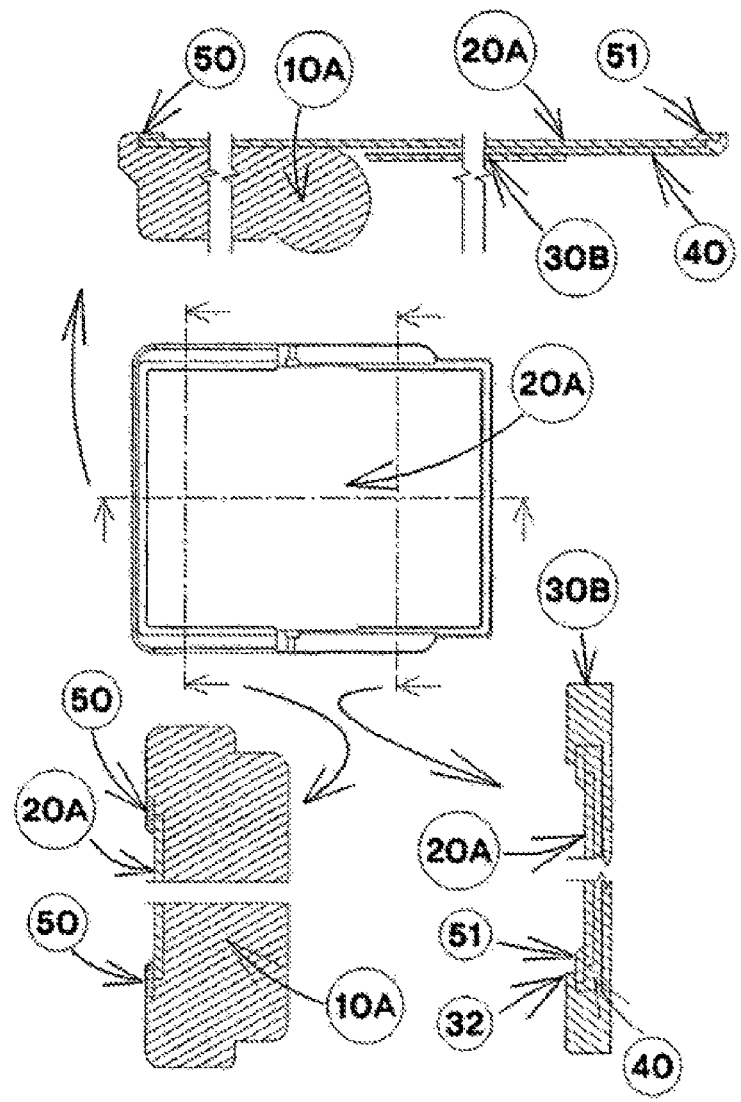

[FIG. 9]
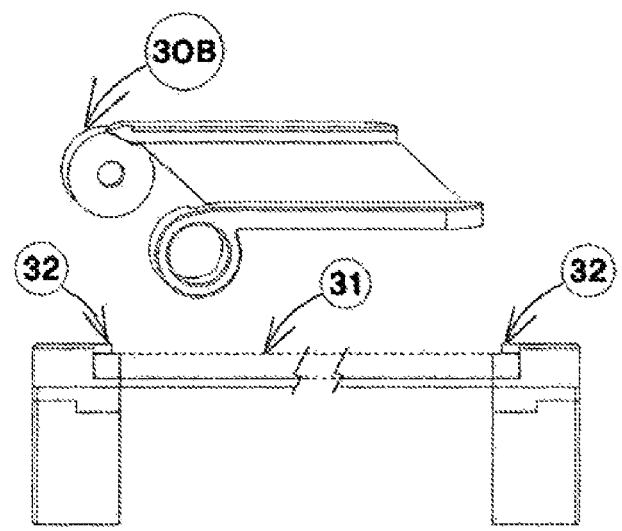
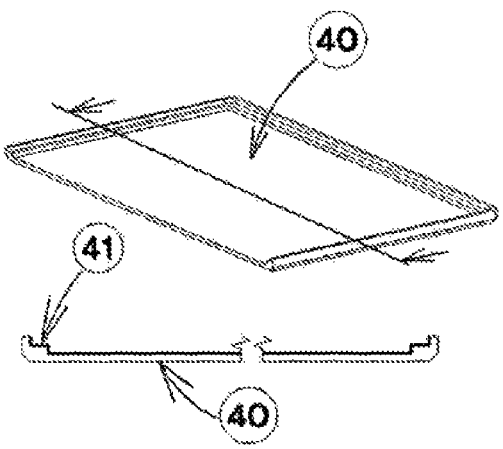

[FIG. 10]
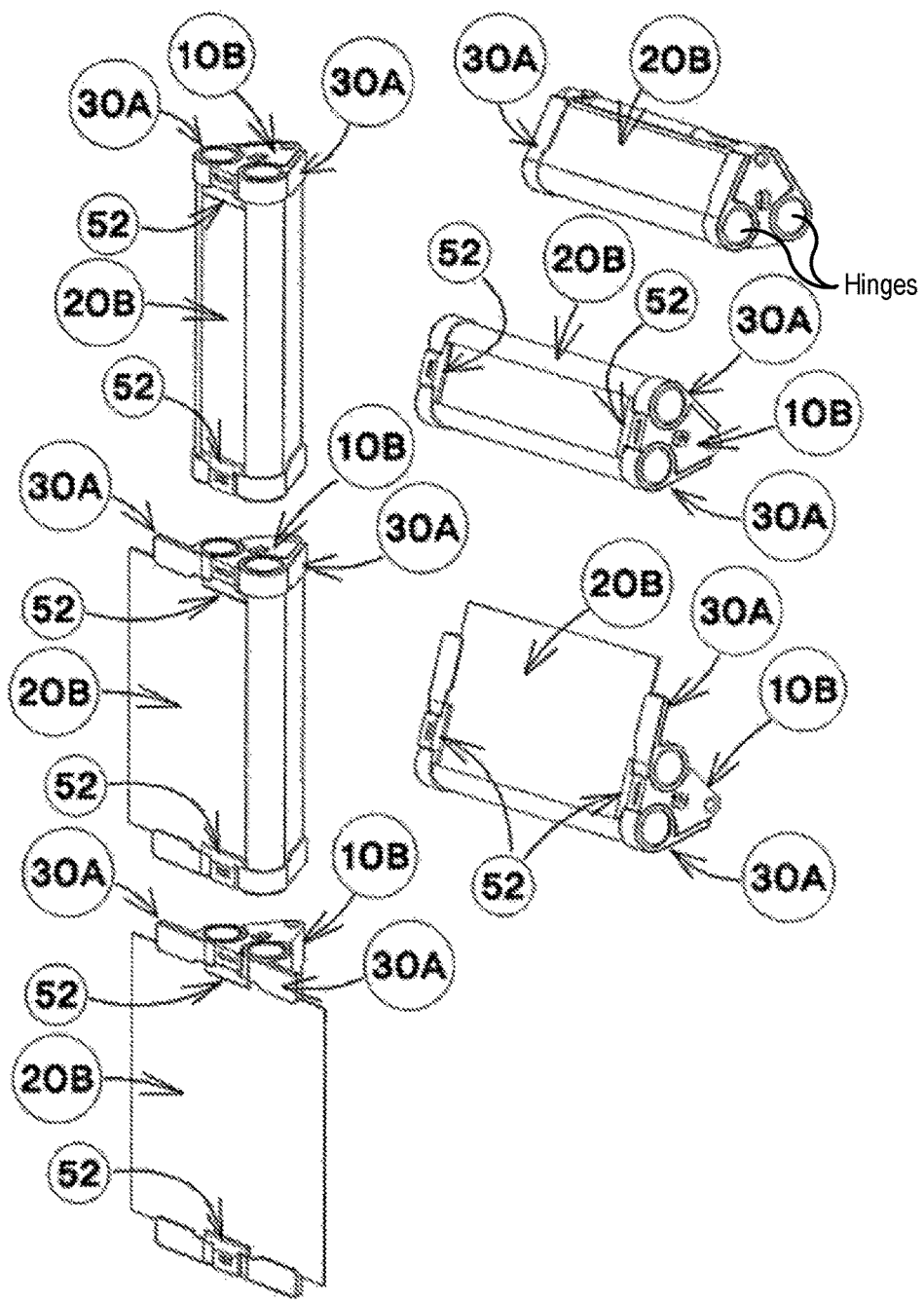

[FIG. 11]
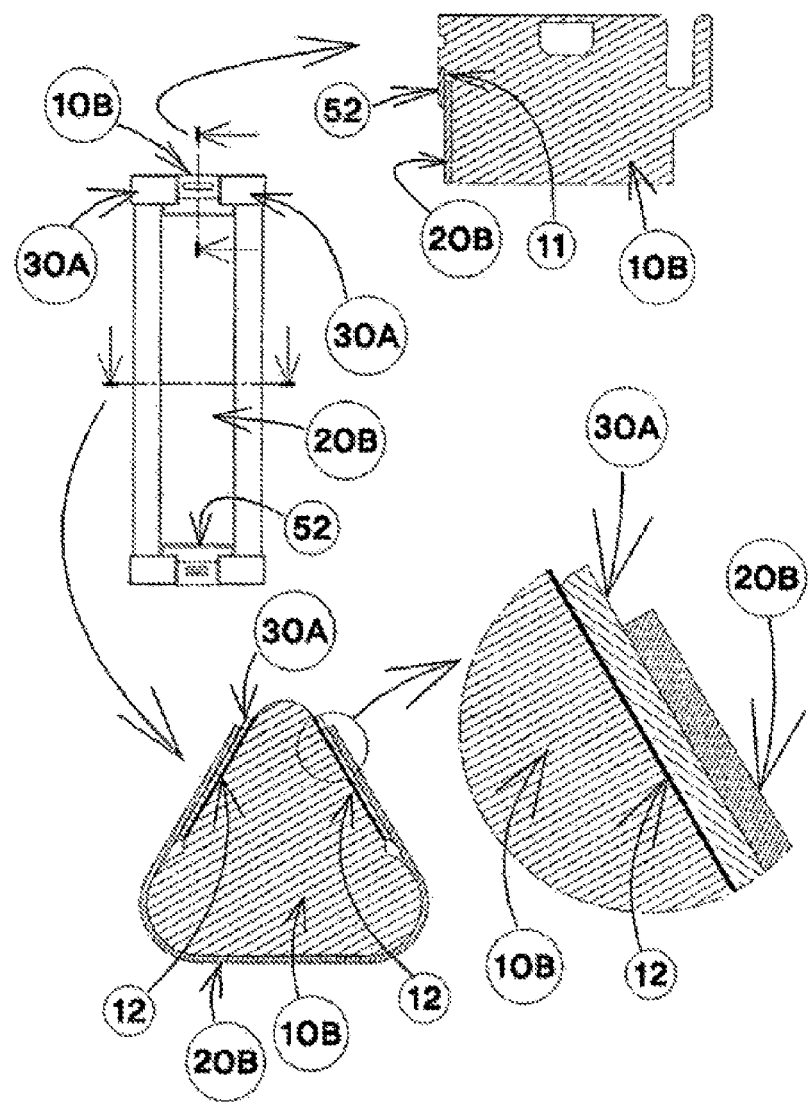

[FIG. 12]
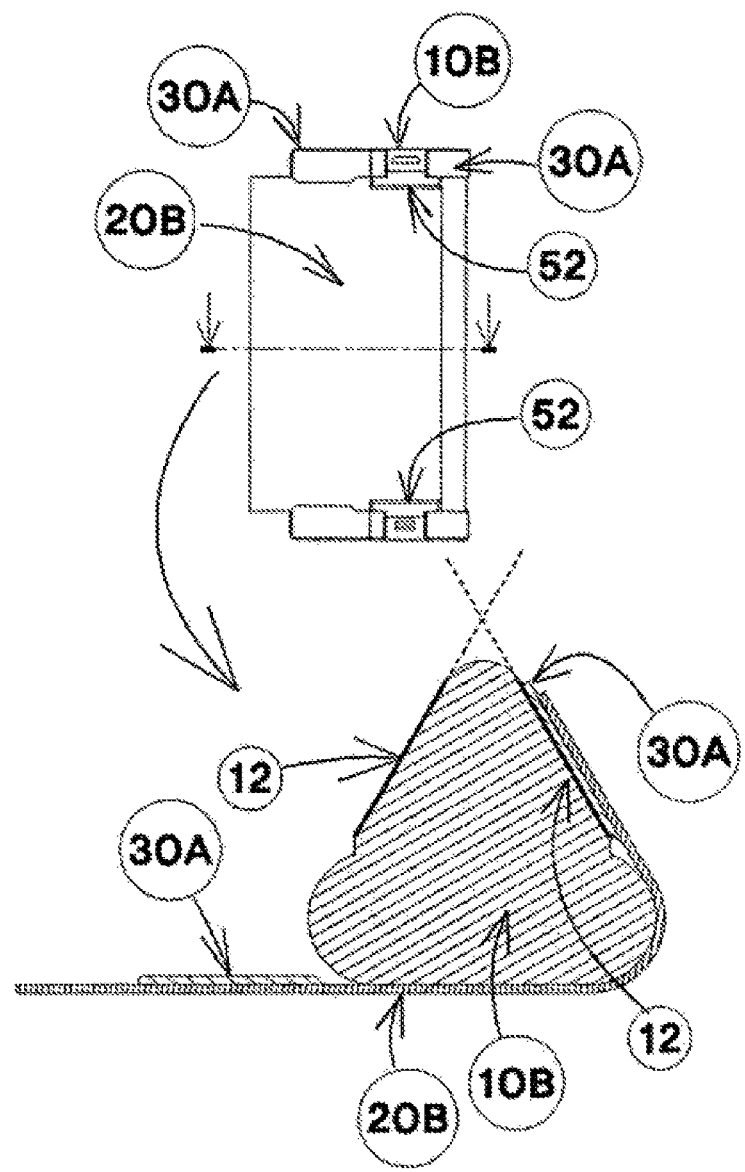

[FIG. 13]
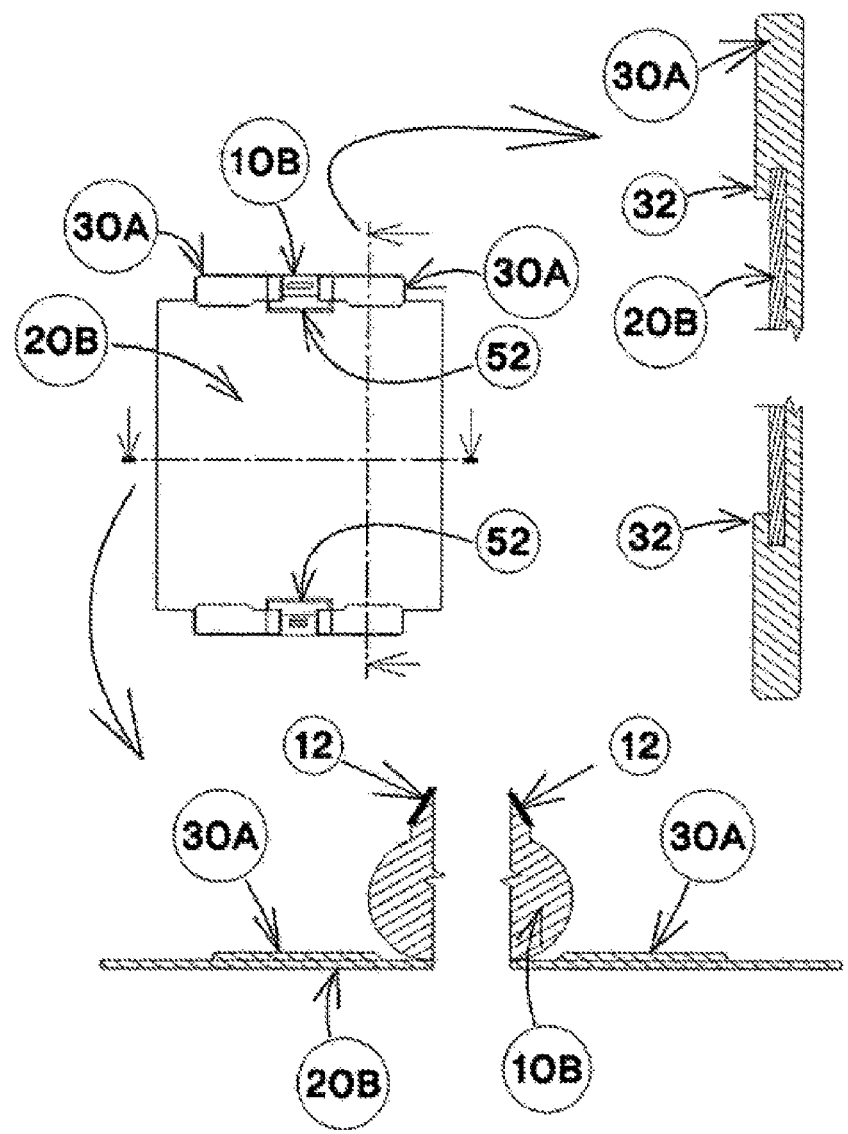

[FIG. 14]
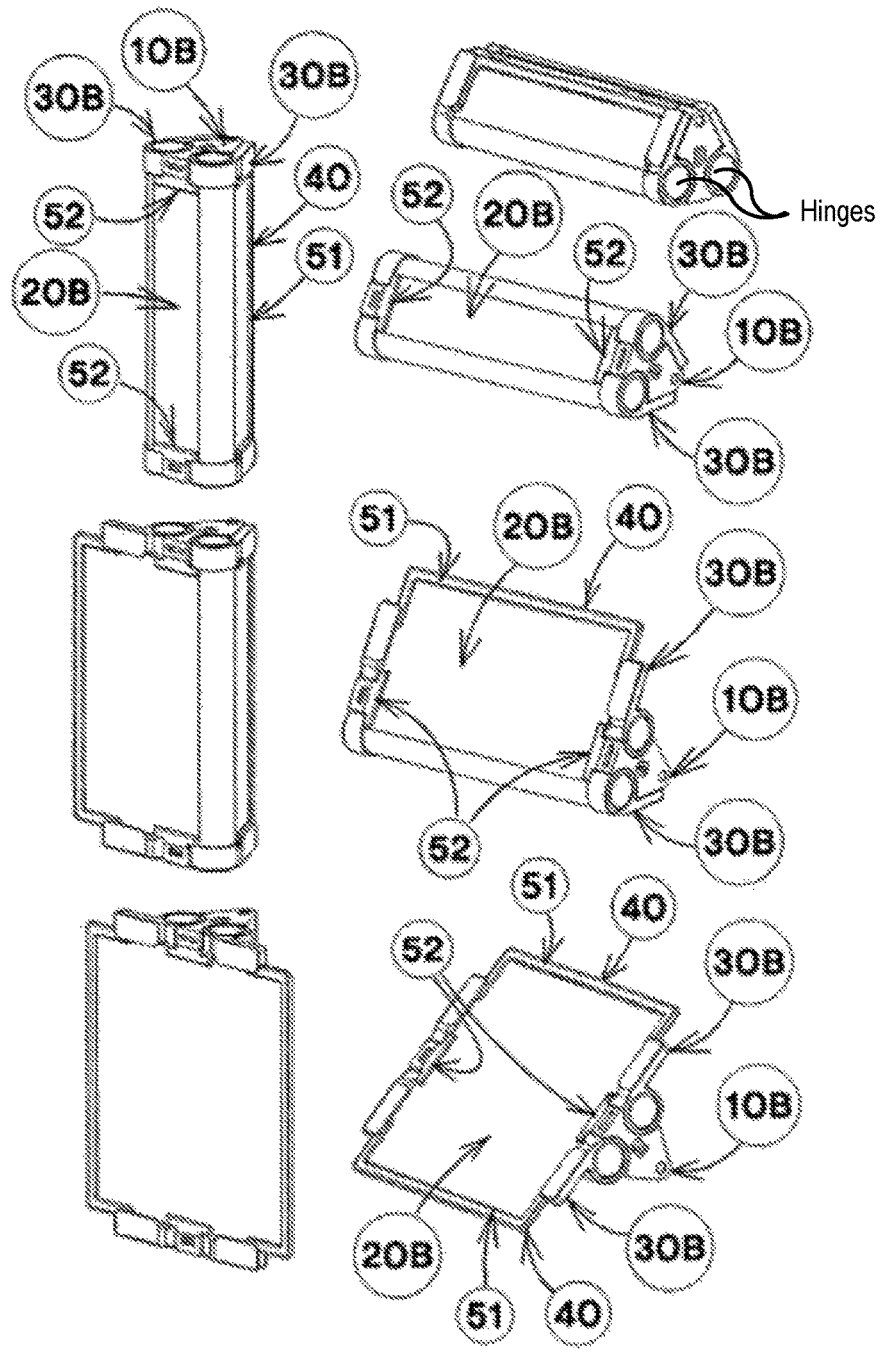

[FIG. 15]
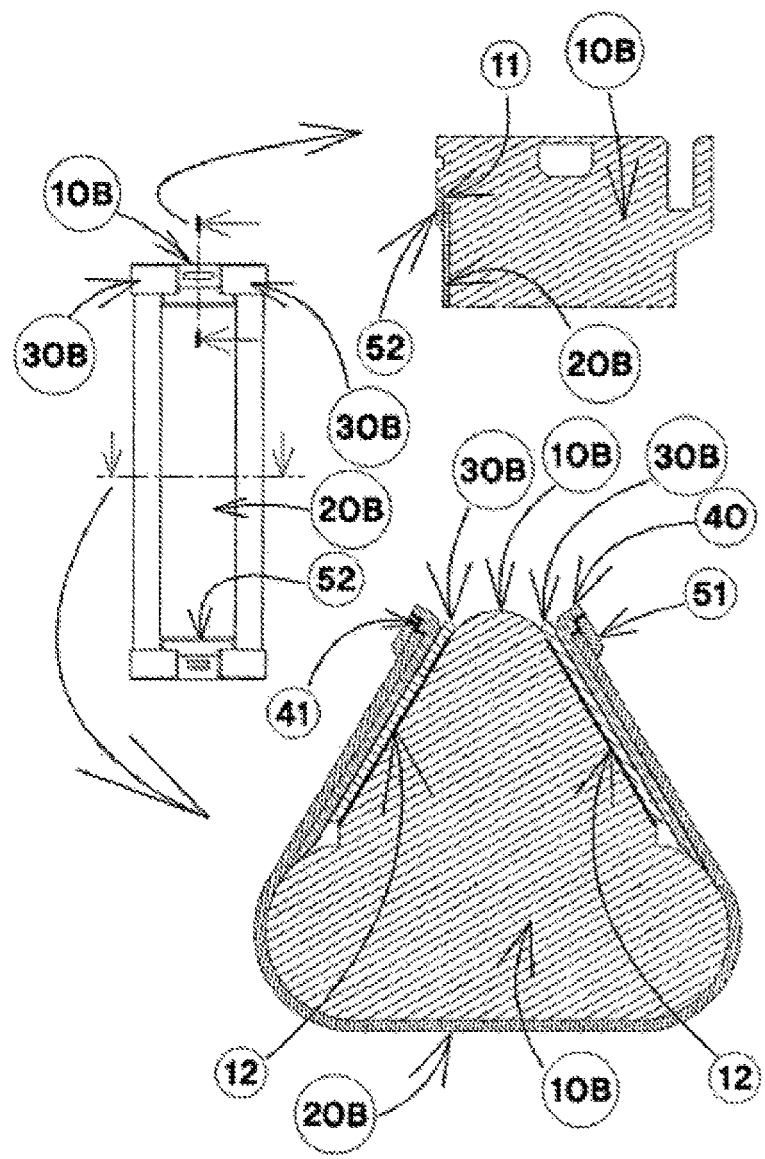

[FIG. 16]
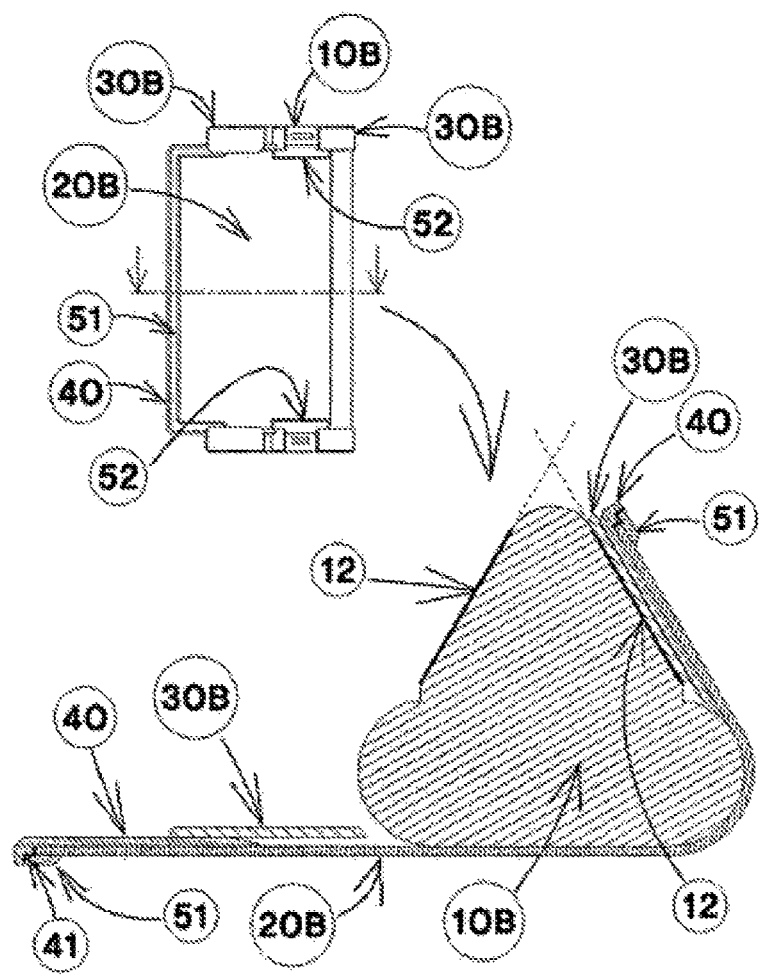

[FIG. 17]
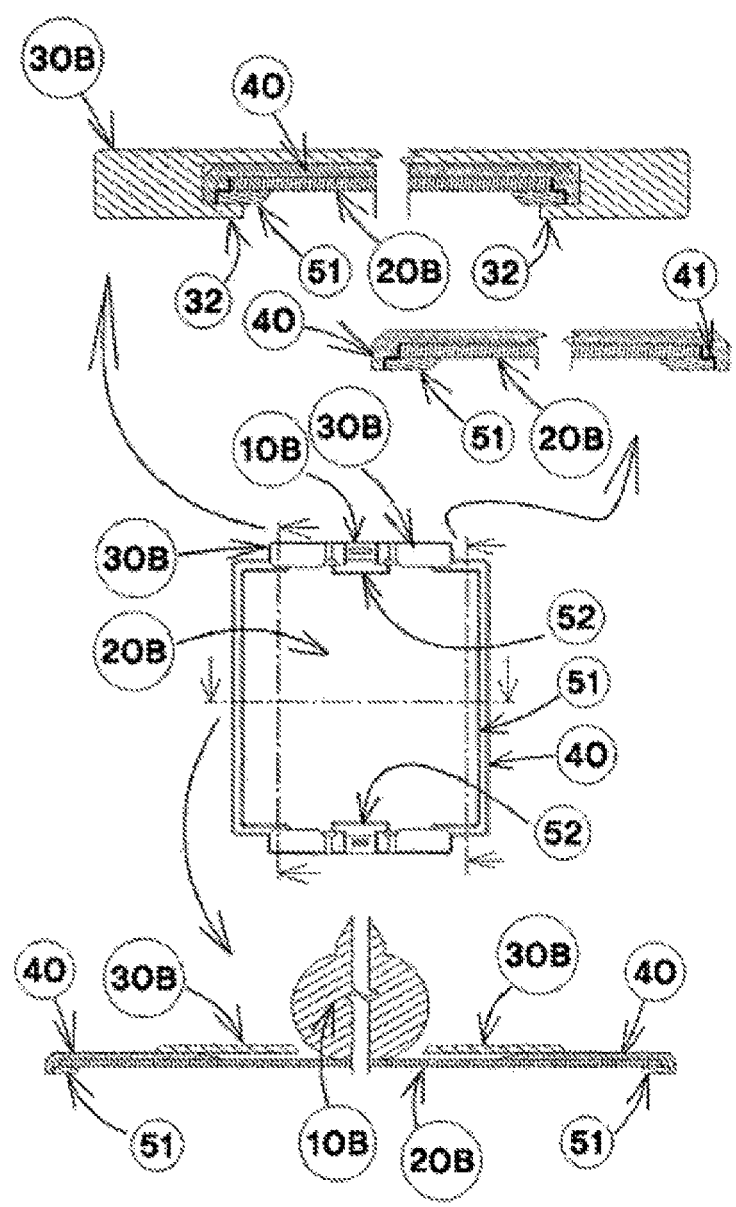

FLEXIBLE DISPLAY DEVICE OF WHICH END PORTION IS PERTURBABLE BY USING ELASTIC FORCE OF FLEXIBLE DISPLAY DEVICE DURING HINGE OPERATION

CROSS-REFERENCE TO PRIOR APPLICATIONS

This application is a divisional application of U.S. patent application Ser. No. 15/430,447, filed on Feb. 11, 2017, which is a Continuation-in-part Application of PCT International Patent Application No. PCT/KR2015/008558, filed on Aug. 17, 2015, which claims priority of Korean Patent Application No. 10-2014-0106358, filed on Aug. 15, 2014, which are all hereby incorporated by reference in their entirety.

BACKGROUND OF THE INVENTION

Field of the Invention

The present invention relates to a flexible display apparatus to which a flexible panel or electronic paper being freely foldable is applied, and more particularly, to a flexible display apparatus which can make an unfixed portion of the flexible panel or electronic paper slide using elasticity of the flexible panel or the electronic paper according to folding and unfolding of a hinge, thereby solving the problem that the central portion of the flexible panel or the electronic paper projects upwardly and soars up because the flexible panel or the electronic paper does not absorb a lengthwise change occurring by a circumferential change of the outer circumferential surface of the hinge when the hinge is folded or unfolded or that one end gets torn due to lack of elasticity when the hinge is folded.

Background Art

A display apparatus is an important part of electronic apparatus including an image device and a mobile communication device. Recently, flexible display means, such as a flexible panel or electronic paper, which is bendable and foldable, besides a conventional plate-type LCD panel, has been shown.

In order to apply such flexible display means to an image device and a communication device, a plurality of patents in relation with a winding type to store the flexible display means by winding using a roller and a folding type to store the flexible display means by folding at a folded part with a predetermined curvature have been disclosed.

Differently from the winding type, because the folding type does not need the roller and roller-related components, various patents of a method that an image display side is folded internally while facing each other like a notebook and flexible display means is fixed and supported on an inner face of a notebook case have been disclosed. However, such folding type display apparatuses have several disadvantages in that the problem causing a stepped portion on the image display side in a perfectly expanded state is not perfectly solved and in that the folded part is not protected from external force with constant curvature.

As another way of the folding type, Korean Patent Application No. 10-2008-0012667 discloses a multi-faced display using flexible display means adopting the method that the central portion is directly folded in a state where image display sides of flexible display means face an outer face and are opposed to each other. However, because the flexible display means lacking elasticity cannot absorb the lengthwise change at the portion corresponding to the circumferential length of a folded portion when the central portion is folded or unfolded, a sealed state may be damaged. So, Korean Patent Application No. 10-2010-0062787 discloses a mobile communication terminal with flexible display means to which a hinge is applied. In Korean Patent Application No. 10-2010-0062787, one end portion of the flexible display means is not directly fixed, but is varied in direction toward the inner face using a roller positioned inside an edge of the opposite side of the hinge, and then, a spring is applied to the end portion of the flexible display means varied in direction in order to absorb the lengthwise change.

However, due to the structural limitation that a constant tension by the spring is locally applied to one end portion of the flexible display means and the end portion is suddenly changed in direction and pulled using the roller, a sealed state of the flexible display means may be destroyed.

Moreover, because the circumference of unfixed end portion of the flexible display means causes friction with surrounding parts when the hinge is folded or unfolded, if the flexible display means is used for a long time, the sealed state may be damaged.

Furthermore, the single hinge is applied just to one end, but even if the application of the hinge is extended in such a way that hinges are applied to both sides of the edge, the application method is ambiguous and how to avoid mutual interference when the hinges are folded at the same time must be considered.

Additionally, due to the thin plate type body of the hinge, a user may feel inconvenient in use because the user must continuously grasp the flexible display means with the hand or use the flexible display means laying on a flat floor.

Differently from the mobile communication terminal with flexible display means to which the hinge is applied, Korean Patent Application No. 10-2012-0068710 discloses a flexible display device to which link members are applied instead of the hinge, so that the link members absorb the lengthwise change at the part corresponding to the circumferential length of the edge where folding is caused.

However, the flexible display device to which the link members are applied can exactly absorb the lengthwise change at the part corresponding to the circumferential length of the edge only when folding or unfolding of the link members is finished, and the link members are not always actuated at the same time but one of the link members is first actuated at random during the folding or unfolding process. Therefore, the flexible display device may damage the sealed state at the folded part during the folding and unfolding process.

Additionally, if different external forces are applied to a first supporter or a second supporter corresponding to a fixing body, differently from the hinge, the link members may be distorted and damage related components.

In addition, in a perfectly unfolded state, because the flexible display device does not have a part to properly block out light incident from the back of the central portion where the link members are located, there is a difference in color between both end portions and the central portion.

SUMMARY OF THE INVENTION

Accordingly, the present invention has been made in view of the above-mentioned problems occurring in the prior art, and it is an object of the present invention to provide a flexible display apparatus which is rarely damaged at a folded part even though there is an external force, adopts a hinge mechanism to correctly cope with a lengthwise change of the outer circumferential surface according to the bending degree and can prevent that the central portion of flexible display means on which a hinge is located projects upwardly and soars up or an end portion of the flexible display means gets torn due to lack of elasticity during operation of the hinge without using any direction-changing roller or any spring providing a constant tension.

It is another object of the present invention to provide a flexible display apparatus which can protect the circumference of an unfixed end portion of one side of the flexible display means from external factors during operation of the hinge, thereby preventing damage of a sealed state at the circumference of the flexible display means.

It is a further object of the present invention to provide a flexible display apparatus which has hinges applied to edges of both sides for expansion of an image display side and convenience in storage in such a way that the hinges do not cause mutual interference even though the hinges are folded at the same time.

It is a still further object of the present invention to provide a flexible display apparatus which allows the user to use the flexible display apparatus in various conditions according to unfolded states of the hinges without the user's grasping power.

To accomplish the first object, according to the present invention, there is provided a flexible display apparatus including a single hinge fixing body of which a hinge is applied to one edge; flexible display means whose one end portion is fixed to the single hinge fixing body and whose the other end portion which is not fixed is capable of being folded and unfolded in a state where the unfixed portion is supported at the outer circumferential surface of the hinge; a cover plate which is assembled to a hinge shape of the single hinge fixing body in a rotatable state and has a sliding space part and a sliding guide for allowing sliding of the unfixed portion of the flexible display means and supporting the unfixed portion of the flexible display means; a first fixing plate of which the central portion is perforated and whose one edge is opened and which is fixed to the single hinge fixing body while pressing the flexible display means; and a folding sensor assembled to the single hinge fixing body to sense folding and unfolding of the hinge.

In another aspect of the present invention, in order to accomplish the first and second objects, according to the present invention, there is provided a flexible display apparatus including: a single hinge fixing body of which a hinge is applied to one edge; flexible display means whose one end portion is fixed to the single hinge fixing body and whose the other end portion which is not fixed is capable of being folded and unfolded in a state where the unfixed portion is supported at the outer circumferential surface of the hinge; a sliding plate which surrounds the circumference of the unfixed end portion of the flexible display means and is fixed in contact with the opposite side of an image display side to slide together with the unfixed end portion of the flexible display means; a cover plate which is assembled to a hinge shape of the single hinge fixing body in a rotatable state and has a sliding space part and a sliding guide for allowing sliding of the sliding plate and supporting the sliding plate; a first fixing plate of which the central portion is perforated and whose one edge is opened and which is fixed to the single hinge fixing body while pressing the flexible display means; a second fixing plate of which the central portion is perforated and whose one edge is opened and which is fixed to the sliding plate while pressing the flexible display means; and a folding sensor which is assembled to the single hinge fixing body to sense folding and unfolding of the hinge.

In a further aspect of the present invention, in order to accomplish the first, third and fourth objects, according to the present invention, there is provided a flexible display apparatus including: a dual hinge fixing body of which hinge shapes are applied to two edges; flexible display means whose central portion is fixed to one side of the dual hinge fixing body and whose both unfixed end portions are respectively supported on outer circumferential surfaces of the hinges to keep a foldable and unfoldable state; a pair of cover plates which are assembled to the hinge shapes of the dual hinge fixing body in a rotatable way and each of which has a sliding space part and a sliding guide for allowing sliding of the unfixed end portion of one side of the flexible display means and supporting the unfixed end portion of the flexible display means; a pair of third fixing plates which have a straight form and are fixed to the dual hinge fixing body while pressing in contact with the circumference of the upper face of the flexible display means; and a pair of folding sensors which are assembled to the dual hinge fixing body to sense folding and unfolding of the hinges.

In a still further aspect of the present invention, in order to accomplish the first, second, third and fourth objects, according to the present invention, there is provided a flexible display apparatus including: a dual hinge fixing body of which hinge shapes are applied to two edges; flexible display means whose central portion is fixed to one side of the dual hinge fixing body and whose both unfixed end portions are respectively supported on outer circumferential surfaces of the hinges to keep a foldable and unfoldable state; a pair of sliding plates which surround the circumference of the unfixed end portion of one side of the flexible display means and are fixed in contact with the opposite side of an image display side to slide together with the unfixed end portion of the flexible display means; a pair of cover plates which are assembled to a hinge shape of the dual hinge fixing body in a rotatable state and each of which has a sliding space part and a sliding guide for allowing sliding of the sliding plate and supporting the sliding plates; a pair of third fixing plates which have a straight form and are fixed to the dual hinge fixing body while pressing in contact with the circumference of the upper face of the flexible display means; a pair of second fixing plates of which the central portion is perforated and whose one edge is opened and which is fixed to the sliding plate while pressing the flexible display means; and a pair of folding sensors which are assembled to the dual hinge fixing body to sense folding and unfolding of the hinges.

As described above, according to the first, second, third and fourth preferred embodiments of the present invention, because the whole of the flexible display means A or B is not fixed but one end portion or the central portion of the flexible display means is fixed and the remaining unfixed portion directly slides on the cover plate A or slides on the cover plate B together with the sliding plate while getting in close contact with the sliding plate, the flexible display apparatus according to the present invention can prevent that the central portion of flexible display means on which the hinge is located projects upwardly and soars up or the end portion of the flexible display means gets torn due to lack of elasticity when the hinge is operated.

Moreover, according to the second and fourth preferred embodiments, because the flexible display means A and the unfixed end portion of the flexible display means B are surrounded and fixed by the sliding plate and the fixed flexible display means A and the circumference of the upper face of the flexible display means B are pressed by the second fixing plate and fixed on the sliding plate, the circumferential portions carrying out a direct sliding action are protected in the sealed state without being exposed to the outside, so that the flexible display apparatus according to the present invention can solve the problem that the sealed state of the flexible display means is damaged.

Furthermore, according to the first and third preferred embodiments of the present invention, because the sliding plate and the second fixing plate are not applied to the flexible display means, the flexible display means A and the circumference of the unfixed end portion of the flexible display means B are not protected, but the present invention can be protected within a limited range because the part located on the sliding guide of the sliding plate is not exposed to the outside.

Additionally, according to the third and fourth preferred embodiments of the present invention, in the dual hinge fixing body of which the hinge folding support surfaces of both sides for supporting the hinges in the folded state are not parallel with each other and to which hinges are respectively applied to two edges, because the lengths of the cover plate A or the cover plates B are limited so that the cover plate A assembled to the hinge in a rotatable way or the end portions of the cover plates B do not go over the intersection points of extension lines of the hinge folding support surfaces, the present invention can prevent mutual interference between the cover plates even though the cover plates located at both sides are folded or unfolded at the same time.

In addition, according to the third and fourth preferred embodiments of the present invention, the present invention can keep the inclinedly arranged state stably on the side where the hinge is folded because the dual hinge fixing body which has the hinge folding support surfaces are not parallel with each other is applied. According to the fourth preferred embodiment, because the sliding plate is additionally applied to the third preferred embodiment, in the perfectly unfolded state of the flexible display means A, contact surfaces are formed and supported at portions located adjacent to the intersection points between the edge of the end of the sliding plate and the extension lines of the hinge folding support surfaces of the dual hinge fixing body. Therefore, the present invention can obtain various effects, such as increase of expandability of the image display side, convenience in storage, and convenience in use.

BRIEF DESCRIPTION OF THE DRAWINGS

The above and other objects, features and advantages of the present invention will be apparent from the following detailed description of the preferred embodiments of the invention in conjunction with the accompanying drawings, in which:

FIG. 1 illustrates an example showing a change of flexible display means according to a folding and unfolding action of a hinge;

FIG. 2 illustrates examples by states of a flexible display apparatus according to a first preferred embodiment of the present invention;

FIG. 3 illustrates a perspective view and a front view of a cover plate according to the first preferred embodiment of the present invention;

FIG. 4 illustrates a plan view and a sectional view showing a folded state according to the first preferred embodiment of the present invention;

FIG. 5 illustrates a plan view and a sectional view showing an unfolded state according to the first preferred embodiment of the present invention;

FIG. 6 illustrates examples by states of a flexible display apparatus according to a second preferred embodiment of the present invention;

FIG. 7 illustrates a perspective view and a front view of a cover plate and a sliding plate according to the second preferred embodiment of the present invention;

FIG. 8 illustrates a plan view and a sectional view showing a folded state according to the second preferred embodiment of the present invention;

FIG. 9 illustrates a plan view and a sectional view showing an unfolded state according to the second preferred embodiment of the present invention;

FIG. 10 illustrates examples by states of a flexible display apparatus according to a third preferred embodiment of the present invention;

FIG. 11 illustrates a plan view and a sectional view showing a folded state of both sides according to the third preferred embodiment of the present invention;

FIG. 12 illustrates a plan view and a sectional view showing a unfolded state of one side and a side folded state of one side according to the third preferred embodiment of the present invention;

FIG. 13 illustrates a plan view and a sectional view showing a unfolded state of both sides according to the third preferred embodiment of the present invention;

FIG. 14 illustrates examples by states of a flexible display apparatus according to a fourth preferred embodiment of the present invention;

FIG. 15 illustrates a plan view and a sectional view showing a folded state of both sides according to the fourth preferred embodiment of the present invention;

FIG. 16 illustrates a plan view and a sectional view showing a unfolded state of one side and a side folded state of one side according to the fourth preferred embodiment of the present invention; and FIG. 17 illustrates a plan view and a sectional view showing an unfolded state of both sides according to the fourth preferred embodiment of the present invention.

DETAILED DESCRIPTION OF THE PREFERRED EMBODIMENT

Hereinafter, exemplary embodiments of the present invention will be described with reference to the accompanying drawings. Terms used in the specification are provided for description of the exemplary embodiments, and the present invention is not limited thereto. In the specification, singulars in sentences include plural unless otherwise noted. Moreover, since preferred embodiments are provided below, the order of the reference numerals given in the description is not limited thereto.

FIG. 1 illustrates an example showing a change of flexible display means according to a folding and unfolding action of a hinge.

In FIG. 1, a length L1 of a hinge cylindrical surface, which gets in contact with flexible display means according to a change in folding angle of a hinge has a maximum value in a perfectly folded state and has a minimum value in a perfectly unfolded state, and follows the following formula according to a change in folding angle:

Length L1 of hinge cylindrical surface getting in contact with flexible display means=hinge radius×folding angle (radian).

When the hinge is folded in a state where both end portions of the flexible display means with small longitudinal elasticity are fixed in a contact state, because the value of L1 increases as the folding angle increases, it is impossible to fold unless fixation of any one side of the flexible display means is released or it is inevitable that the flexible display means gets torn if it is folded forcibly.

In order to avoid such problems, if fixation of the flexible display means is released from the side where electrical connection is achieved, it may cause a problem of electrical connection.

On the contrary, if the perfectly folded state is converted into the perfectly unfolded state and the bending angle decreases, the value L1 is also decreased. Unless fixation of any one side of the flexible display means is released, the flexible display means rises up from a hinge part or cannot reach the perfectly unfolded state.

In order to solve the above-mentioned problems, Korean Patent Application No. 10-2010-0062787 discloses a mobile communication terminal with flexible display means of which the hinge is applied to an edge of one side. One end of the flexible display means is kept in a fixed state but the other end is not directly fixed on a hinge at a predetermined distance but is fixed inside through a spring, which applies tension to the end of one side, after changing its direction to an inner face using a roller of the inside of the edge.

However, the mobile communication terminal to which the hinge is applied has a disadvantage in that a sealed state of the flexible display means or an electrically connected part gets damaged due to the constant tension action by the spring at the end of the one side of the flexible display means and due to the structural limitation that the end of one side of the flexible display means must be rapidly changed and pulled in the inward direction and using the roller.

Moreover, at the time of a hinge action, because a peripheral part of the flexible display means which is not fixed causes a continuous friction with surrounding supports, long-term use of the flexible display means may damage the sealed state of the flexible display means.

In order to solve such problems of the exemplary flexible display means illustrated in FIG. 1 and the flexible display means disclosed in Korean Patent Application No. 10-2010-0062787, Korean Patent Application No. 10-2012-0068710 discloses a flexible display device to which not the hinge but link members are applied.

The flexible display device to which the link members are applied adopts a method that the link members absorb a change in length of a part corresponding to a circumferential length of an edge portion where folding or unfolding is caused when the flexible display device is folded or unfolded.

However, the flexible display device to which the link members are applied has three rotating portions at one link member and at least two link members act to fold and unfold the flexible display device.

Therefore, during folding and unfolding, because both of the link members are not operated at the same time but one of the link members is first operated at random, the link members cannot exactly absorb the change in length at the folded part, and as a result, the sealed state of the folded part may be damaged.

Furthermore, in the flexible display device to which the link members are applied, if different external forces are applied to a first supporter or a second supporter which is a fixing member of the flexible display device, differently from the hinge, the link members may be distorted and damaged.

Additionally, the flexible display device to which the link members are applied has another disadvantage in that the folding process is stopped because foreign matters are stuck to the link members, which is folded scissors at the time of the folding action or a user may get hurt because the user's finger end is pinched in the link members.

In order to solve the problems of the exemplary flexible display means illustrated in FIG. 1, the flexible display means disclosed in Korean Patent Application No. 10-2010-0062787 and the flexible display device disclosed in Korean Patent Application No. 10-2012-0068710, the present invention proposes a flexible display apparatus capable of a sliding action using elasticity of flexible display means being foldable according to first, second, third and fourth preferred embodiments of the present invention because the present invention can be realized by various cases.

The flexible display apparatus according to the first preferred embodiment of the present invention is characterized in that a single hinge is applied to an edge and one end of the flexible display means is fixed and an unfixed part is folded or unfolded while sliding after passing through a sliding supporting object in a vertical direction to a hinge rotation axis during a hinge action.

FIG. 2 illustrates examples by states of the flexible display apparatus according to the first preferred embodiment of the present invention, FIG. 3 illustrates a perspective view and a front view of a cover plate according to the first preferred embodiment of the present invention, FIG. 4 illustrates a plan view and a sectional view showing a folded state according to the first preferred embodiment of the present invention, and FIG. 5 illustrates a plan view and a sectional view showing an unfolded state according to the first preferred embodiment of the present invention.

As illustrated in FIGS. 2 to 5, the flexible display apparatus according to the first preferred embodiment of the present invention includes: a single hinge fixing body 10A of which a hinge is applied to one edge; flexible display means 20A whose one end portion is fixed to the single hinge fixing body 10A and whose the other end portion which is not fixed is capable of being folded and unfolded in a state where the unfixed portion is supported at the outer circumferential surface of the hinge; a cover plate 30A which is assembled to a hinge shape of the single hinge fixing body 10A in a rotatable state and has a sliding space part 31 and a sliding guide 32 for allowing sliding of the unfixed portion of the flexible display means 20A and supporting the unfixed portion of the flexible display means 20A; a first fixing plate 50 of which the central portion is perforated and whose one edge is opened and which is fixed to the single hinge fixing body 10A while pressing the flexible display means 20A; and a folding sensor 60 which is assembled to the single hinge fixing body 10A to sense folding and unfolding of the hinge.

In order to correspond to a change in the value of L1 according to a change in folding angle of the hinge, one end portion of the flexible display means 20A according to the first preferred embodiment is not fixed and slides while passing through the cover plate 30A.

For this, a fixing plate supporting part 11A of a two-stage concave form to fix one end portion of the flexible display means 20A on an upper face of the single hinge fixing body 10A, and a hinge folding support surface 12 is formed on the opposed side of the fixing plate supporting part 11A to support the folded state of the hinge.

When the unfixed end portion of the flexible display means 20A whose one end is surrounded by the fixing plate supporting part 11A and which is fixed to the fixing plate supporting part 11A is located on the cover plate 30A without any support, because the unfixed portion of the flexible display means is not kept in the sliding state on the cover plate 30A under the folded state of the hinge and protrudes out of the cover plate 30A by its elasticity, it may cause deterioration of portability and damage of the flexible display means 20A.

In order to prevent the problems, the cover plate 30A must have the form that the unfixed end portion of the flexible display means 20A can pass through and slide in a supported state, and so, includes the sliding space part 31 and the sliding guide 32 as shown in FIG. 3.

The sliding space part 31 means a space perforated in the sliding direction as much as the cross sectional shape of the flexible display means 20A located on the cover plate 30A. Therefore, the unfixed end portion of the flexible display means 20A keeps a flat surface and can pass through and slide without limitation.

The sliding guide 32 is formed when the upper face existing above the sliding space part 31 is perforated from both ends parallel to the sliding direction with just a predetermined length to make the central portion open so that the flexible display means 20A is caught. Therefore, an image display side of the flexible display means 20A is freely exposed through the opened portion.

The mobile communication terminal with the flexible display means disclosed in Korean Patent Application No. 10-2010-0062787 to which the hinge is applied has the forms similar with the sliding space part 31 and the sliding guide 32, but the conventional flexible display means is different from the embodiments of the present invention in functions.

In Korean Patent Application No. 10-2010-0062787, because both sides of the form similar with the sliding space part 31 do not pass through in the sliding direction and just one side located on the hinge is opened, the unfixed end portion of the flexible display means is deviated from the unpenetrated end so as not to carry out penetration and sliding. Therefore, the mobile communication terminal with the flexible display means disclosed in Korean Patent Application No. 10-2010-0062787 is lower in expandability of the image display side than the embodiments of the present invention.

Moreover, in the conventional flexible display means to which the hinge is applied, differently from the sliding guide 32 of the present invention, even though the form similar with the sliding guide 32 is perforated, the flexible display means is not separated or any serious problem in sliding and support is not caused. Therefore, the form similar with the sliding guide is different from the sliding guide 32 of the present invention in that the similar form just hides the circumference of the flexible display.

As illustrated in FIGS. 2, 4 and 5, the fixed end portion of the flexible display means 20A whose one end is closely fixed by the first fixing plate 50 fixed at the fixing plate supporting part 11A keeps the fixed state not to slide, and the unfixed end portion of the opposite side located on the cover plate 30A is kept in a slidable state. Therefore, when the unfolded state of the hinge is converted into the folded state, there is an effect that the end portion of the flexible display means 20A located on the cover plate 30A goes toward the hinge to offset the increase of the value of L1 according to increase of the folding angle, so that the flexible display means 20A is prevented from being torn or damaged and the electrical connection between the single hinge fixing body 10A and the flexible display means 20A is kept easily.

Furthermore, when a perfectly folded state of the hinge is converted into a perfectly unfolded state, there is an effect that the end portion of the flexible display means 20A located on the cover plate 30A is pushed out and slid from the hinge to offset decrease of the value of L1 according to decrease of the folding angle, so that the flexible display means 20A is prevented from protuberating from the hinge.

The first preferred embodiment of the present invention has a disadvantage in that the circumference of the unfixed portion of the flexible display means 20A causes friction during the hinge action because the unfixed end portion of the flexible display means 20A is supported on the cover plate 30A in the slidable way, but has advantages in that the flexible display apparatus according to the first preferred embodiment is simplified in components and it is advantageous for securing a space for the single hinge fixing body 10A.

The second preferred embodiment of the present invention is to improve the friction problem of the unfixed end portion of the flexible display means 20A according to the first preferred embodiment, and includes a sliding plate 40 and a second fixing plate 51 additionally to the first preferred embodiment of the present invention.

FIG. 6 illustrates examples by states of the flexible display apparatus according to the second preferred embodiment of the present invention, FIG. 7 illustrates a perspective view and a front view of a cover plate and a sliding plate according to the second preferred embodiment of the present invention, FIG. 8 illustrates a plan view and a sectional view showing a folded state according to the second preferred embodiment of the present invention, and FIG. 9 illustrates a plan view and a sectional view showing an unfolded state according to the second preferred embodiment of the present invention.

As illustrated in FIGS. 6 to 9, the flexible display apparatus according to the second preferred embodiment of the present invention includes: a single hinge fixing body 10A of which a hinge is applied to one edge; flexible display means 20A whose one end portion is fixed to the single hinge fixing body 10A and whose the other end portion which is not fixed is capable of being folded and unfolded in a state where the unfixed portion is supported at the outer circumferential surface of the hinge; a sliding plate 40 which surrounds the circumference of the unfixed end portion of the flexible display means 20A and is closely fixed to the opposite side of an image display side to slide together with the unfixed end portion of the flexible display means 20A; a cover plate 30B which is assembled to a hinge shape of the single hinge fixing body 10A in a rotatable state and has a sliding space part 31 and a sliding guide 32 for allowing sliding of the sliding plate 40 and supporting the sliding plate 40; a first fixing plate 50 of which the central portion is perforated and whose one edge is opened and which is fixed to the single hinge fixing body 10A while pressing the flexible display means 20A; a second fixing plate 51 of which the central portion is perforated and whose one edge is opened and which is fixed to the sliding plate 40 while pressing the flexible display means 20A; and a folding sensor 60 which is assembled to the single hinge fixing body 10A to sense folding and unfolding of the hinge.

As illustrated in FIGS. 8 and 9, a fixing plate supporting part 11A which surrounds one end portion of the flexible display means 20A and has a concave form for a close fixation like the first preferred embodiment is formed on one side of the single hinge fixing body 10A of the second preferred embodiment.

As illustrated in FIG. 7, similarly with the first preferred embodiment, the cover plate 30B according to the second preferred embodiment includes: the sliding space part 31 which is formed when the central portion is perforated so that the sliding plate 40 can slide in the sliding direction; and the sliding guide 32 which is formed when the upper face existing above the sliding space part 31 is perforated from both ends parallel to the sliding direction with just a predetermined length to make the central portion open so that the sliding plate 40 is caught.

Additionally, the sliding plate 40 has a sliding plate support part 41 of a concave form which is formed at one side thereof to surround the unfixed end portion of the flexible display means 20A and fix the unfixed end portion.

In order to solve the friction problem of the flexible display apparatus according to the first preferred embodiment, as shown in FIGS. 6, 8 and 9, the flexible display apparatus according to the second preferred embodiment additionally includes the sliding plate 40. Therefore, the unfixed end portion of the flexible display means 20A is integrated with the sliding plate 40 by the second fixing plate 51 fixed on the sliding plate supporting part 41 while pressing the circumference of the upper face so as to keep the slidable state.

As described above, because the circumference of the unfixed end portion of the flexible display means 20A according to the second preferred embodiment is not in direct contact with the cover plate 30B and keeps the sliding relation, the second preferred embodiment can solve the friction problem of the first preferred embodiment.

However, because the second preferred embodiment additionally includes the sliding plate and the second fixing plate 51, the sliding space part 31 of the cover plate 30B is higher than the sliding space part 31 of the cover plate 30A according to the first preferred embodiment. Accordingly, because the hinge folding support surface 12 of the single hinge fixing body 10A moves toward the fixing plate supporting part 11A, the second preferred embodiment is more disadvantageous in securing a space for the single hinge fixing body 10A than the first preferred embodiment.

In the first and second preferred embodiments, at the time of unfolding of the hinge, a power source obtained while the flexible display means 20A or the sliding plate 40 is supported on the sliding guide 32 to slide and is pushed out from a hinge rotation axis is an elastic force of the flexible display means 20A at the hinge part.

However, during the unfolding action of the hinge, the elastic force of the flexible display means 20A at the hinge part is not always converted into a sliding force to move the unfixed end portion of the flexible display means 20A or the sliding plate 40. That is, if a hinge adjoining part of the flexible display means 20A is detached from the single hinge fixing body 10A, the elastic force is not converted into the sliding force but converted into an upward projection force soar above the hinge part.

Therefore, in order to make the unfixed end portion of the flexible display means 20A or the sliding plate 40 slide smoothly using the elastic force during the unfolding action of the hinge, it is necessary to prevent that the hinge adjoining part of the flexible display means 20A is detached from the single hinge fixing body 10A and soars up.

For this, as illustrated in FIGS. 4, 5, 8 and 9, one end portion of the flexible display means 20A is closely fixed to the lower end of the fixing plate supporting part 11 formed on one side of the single hinge fixing body 10A while surrounding the lower part of the fixing plate supporting part 11, and is fixed to the top circumference of the fixing plate supporting part 11A while the first fixing plate 50 presses the upper circumference at which the image display side is located.

As illustrated in FIGS. 2 and 6, because the first and second preferred embodiments have the single hinge fixing body applied to the edge of one side thereof, unless the user grasps the flexible display apparatus with the hand, it is difficult to use the flexible display apparatus on places except flat surfaces, and there may occur an interference at intersection points of the cover plates when the hinge is folded or unfolded even though a hinge is additionally applied to an edge of the other side in order to expand the image display side.

In order to increase expandability of the image display side by applying hinges to edges of both sides and prevent interference when the hinge is folded or unfolded, a third preferred embodiment and a fourth preferred embodiment of the present invention will be proposed with various use states.

FIG. 10 illustrates examples by states of a flexible display apparatus according to the third preferred embodiment of the present invention, FIG. 11 illustrates a plan view and a sectional view showing a folded state of both sides according to the third preferred embodiment of the present invention, FIG. 12 illustrates a plan view and a sectional view showing a unfolded state of one side and a side folded state of one side according to the third preferred embodiment of the present invention, and FIG. 13 illustrates a plan view and a sectional view showing a unfolded state of both sides according to the third preferred embodiment of the present invention.

As illustrated in FIGS. 10 to 13, the flexible display apparatus according to the third preferred embodiment of the present invention includes: a dual hinge fixing body 10B of which hinge shapes are applied to two edges and which has two hinge folding support surfaces 12, on which the hinges of a folded state are supported in a close contact state and which are not parallel to each other; flexible display means 20B whose central portion located between the hinges is fixed to one side of the dual hinge fixing body 10B and whose both unfixed end portions are respectively supported on outer circumferential surfaces of the hinges to keep a foldable and unfoldable state; a pair of cover plates 30A which are assembled to the hinge shapes of the dual hinge fixing body 10B in a rotatable way and each of which has a sliding space part 31 and a sliding guide 32 for allowing sliding of the unfixed end portion of one side of the flexible display means 20B and supporting the unfixed end portion of the flexible display means 20B; a pair of third fixing plates 52 fixed to the dual hinge fixing body 10B while pressing one side of an upper face of the central portion of the flexible display means 20B; and a pair of folding sensors 60 which are assembled to the dual hinge fixing body 10B to sense folding and unfolding of the hinges.

Similar to the first and second preferred embodiments, a fixing plate supporting part 11B of a concave form to surround and fix one side of the upper face of the central portion of the flexible display means 20B is formed on one side of the dual hinge fixing body 10B according to the third preferred embodiment.

Furthermore, similarly with the first preferred embodiment, the cover plate 30B according to the third preferred embodiment includes: the sliding space part 31 which is formed when the central portion is perforated so that the unfixed end portions of the flexible display means 20B can slide in the sliding direction; and the sliding guide 32 which is formed when the upper face existing above the sliding space part 31 is perforated from both ends parallel to the sliding direction with just a predetermined length to make the central portion open so that the flexible display means 20A is caught.

The hinge shape which is applicable to the edges of both sides may be a prism, a prismoid or a pyramid. As illustrated in FIGS. 10 to 13, the hinges are respectively applied to both edges and the remaining edges have a trigonal prism shape with a curvature so that the user does not feel a sharp edge when the user grasps the edges with the hand.

In the dual hinge fixing body 10B according to the third preferred embodiment, because the hinge folding support surfaces of both sides on which the hinges of the folded state are supported in the close contact state are not parallel with each other, there is no interference between the cover plates 30A even though the cover plates 30A are actuated at the same time.

As illustrated in FIGS. 10 to 13, differently from the first preferred embodiment of the present invention, the third preferred embodiment provides convenience in use because it can be used in various states, increases an expansion rate of the image display side in the unfolded state compared with the folded state, can selectively keep one of the hinges of both sides in the unfolded state, and can continuously maintain a state that the image display side is tilted at a predetermined angle toward the user without any special supporting means in the above state.

Additionally, when the hinges of both sides are all converted into the folded state, because the flexible display apparatus keeps not a wide flat type but a narrow prism type, even a user who has small hands can easily grasp it.

However, the third preferred embodiment still has the friction problem like the first preferred embodiment because the circumferences of the unfixed end portions of the flexible display means 20B slide in contact with the cover plate 30A similarly with the first preferred embodiment.

In order to maintain the merits of the third preferred embodiment and solve the friction problem, the fourth preferred embodiment additionally includes a pair of sliding plates 40 and a pair of second fixing plates 51.

FIG. 14 illustrates examples by states of a flexible display apparatus according to the fourth preferred embodiment of the present invention, FIG. 15 illustrates a plan view and a sectional view showing a folded state of both sides according to the fourth preferred embodiment of the present invention, FIG. 16 illustrates a plan view and a sectional view showing a unfolded state of one side and a side folded state of one side according to the fourth preferred embodiment of the present invention, and FIG. 17 illustrates a plan view and a sectional view showing a unfolded state of both sides according to the fourth preferred embodiment of the present invention.

As illustrated in FIGS. 14 to 17, the flexible display apparatus according to the fourth preferred embodiment of the present invention includes: a dual hinge fixing body 10B of which hinge shapes are applied to two edges and which has two hinge folding support surfaces 12, on which the hinges of a folded state are supported in a close contact state and which are not parallel to each other; flexible display means 20B whose central portion located between the hinges is fixed to one side of the dual hinge fixing body 10B and whose both unfixed end portions are respectively supported on outer circumferential surfaces of the hinges to keep a foldable and unfoldable state; a pair of sliding plates 40 which surround the circumference of the unfixed end portion of one side of the flexible display means 20B, is fixed on the opposite side of the image display side in a close contact, and slide together with the unfixed end portion of the flexible display means 20B; a pair of cover plates 30B which are assembled to the hinge shapes of the dual hinge fixing body 10B in a rotatable way and each of which has a sliding space part 31 and a sliding guide 32 for allowing sliding of the sliding plates 40 and supporting the sliding plates 40; a pair of third fixing plates 52 fixed to the dual hinge fixing body 10B while pressing one side of an upper face of the central portion of the flexible display means 20B; a pair of second fixing plates 51 fixed to the sliding plates 40 while pressing the circumference of the upper face of the flexible display means 20B; and a pair of folding sensors 60 which are assembled to the dual hinge fixing body 10B to sense folding and unfolding of the hinges.

Similar to the first and second preferred embodiments, a fixing plate supporting part 11B of a concave form to surround and fix one side of the upper face of the central portion of the flexible display means 20B is formed on one side of the dual hinge fixing body 10B according to the fourth preferred embodiment.

Furthermore, similarly with the second preferred embodiment, the cover plate 30B according to the fourth preferred embodiment includes: the sliding space part 31 which is formed when the central portion is perforated so that the sliding plates 40 can slide in the sliding direction; and the sliding guide 32 which is formed when the upper face existing above the sliding space part 31 is perforated from both ends parallel to the sliding direction with just a predetermined length to make the central portion open so that the sliding plates 40 is caught.

Moreover, like the second preferred embodiment, the sliding plate 40 according to the fourth preferred embodiment has a sliding plate support part 41 of a concave form which is formed at one side thereof to surround the unfixed end portion of the flexible display means 20B and fix the unfixed end portion.

In order to solve the friction problem of the flexible display apparatus according to the third preferred embodiment, as shown in FIGS. 14 to 17, the flexible display apparatus according to the fourth preferred embodiment additionally includes the sliding plates 40. Therefore, the unfixed end portions of the flexible display means 20B are integrated with the sliding plates 40 by the second fixing plates 51 fixed on the sliding plate supporting parts 41 while pressing the circumference of the upper face so as to keep the slidable state.

As described above, because the circumferences of the unfixed end portions of the flexible display means 20B according to the fourth preferred embodiment are not in direct contact with the cover plates 30B and keep the sliding relation, the fourth preferred embodiment can solve the friction problem of the third preferred embodiment.

As illustrated in FIGS. 14 and 17 of the fourth preferred embodiment, differently from the unfolded state of both sides illustrated in FIGS. 10 and 13 of the third preferred embodiment, when the cover plates 30B assembled to both hinges are all unfolded, because the unfixed end portions of the flexible display means 20B are supported by the sliding guide 32 of the cover plates 30B in the close contact with the sliding plates 40 having rigidity, even though the end edges of the sliding plates 40 are in an inclined state in contact with the flat surface, the image display side of the end portion is not bent by self-load.

While the exemplary embodiments of the present invention have been disclosed for illustrative purposes, those skilled in the art will understand that the present invention can be implemented as other concrete forms without changing the inventive concept or essential features. Therefore, these embodiments as described above are only proposed for illustrative purposes and do not limit the present invention.

What is claimed is:

1. A flexible display apparatus, comprising:
   a fixing body having a hinge disposed on one side of the fixing body;
   a cover plate assembled to the hinge so that the cover plate is rotatable relative to the fixing body:
   flexible display means including a first portion fixed to a surface of the fixing body, and a second portion that is rotatable around the hinge; and
   a sliding plate that surrounds circumferences of the second portion of the flexible display means and gets in contact with a surface opposite to an image display surface of the flexible display means to carry out a sliding action together with the second portion of the flexible display means,
   wherein the cover plate comprises:
      a sliding space part through which the second portion of the flexible display means carries out a sliding action; and
      a pair of sliding guides which limits a range of the sliding action of the flexible display means, and
   wherein the pair of sliding guides are arranged perpendicular to the hinge and the sliding space part extends between the pair of sliding guides and the sliding plate slides relative to the sliding space part and sticks out of the cover plate when the cover plate rotates relative to the fixed body.

2. The flexible display apparatus according to claim 1, wherein, when the hinge is fully unfolded, a portion of flexible display means sticks out over an outer edge of the cover plate and an entire portion of the flexible display means forms a flat surface.

3. The flexible display apparatus according to claim 2, wherein the second portion of the flexible display means is slidably engaged between the pair of sliding guides by elasticity of the flexible display means when the cover plate rotates relative to the fixed body.

4. The flexible display apparatus according to claim 2, further comprising a first fixing plate which has a C-shape; and
   wherein the first fixing plate is mounted on the fixing body and presses a circumferential area of an image display surface of the flexible display means so that one side of the flexible display means is fixed to the fixing body.

5. The flexible display apparatus according to claim 1, wherein the sliding plate is slidably engaged between the pair of sliding guides by elasticity of the flexible display means when the cover plate rotates relative to the fixed body.

6. The flexible display apparatus according to claim 5, further comprising a first fixing plate which has a C-shape; and
   a second fixing plate which has a cavity inside thereof and has one side opened;
   wherein the first fixing plate presses a circumferential area of an image display surface of the flexible display means and fixes one side of the flexible display means to the fixing body,
   and wherein the second fixing plate presses a circumferential area of the image display surface of the flexible display means and fixes the other side of the flexible display means to the sliding plate.

* * * * *